United States Patent
Hammons, Jr. et al.

(10) Patent No.: US 7,012,967 B2
(45) Date of Patent: Mar. 14, 2006

(54) METHOD OF GENERATING SPACE-TIME CODES FOR GENERALIZED LAYERED SPACE-TIME ARCHITECTURES

(76) Inventors: A. Roger Hammons, Jr., 14074 Saddle River Rd., North Potomac, MD (US) 20878; Hasham El Gamal, 14220 Oakpointe Dr., Laurel, MD (US) 20707

( * ) Notice: Subject to any disclaimer, the term of this patent is extended or adjusted under 35 U.S.C. 154(b) by 197 days.

(21) Appl. No.: 10/430,002

(22) Filed: May 6, 2003

(65) Prior Publication Data

US 2003/0194022 A1   Oct. 16, 2003

Related U.S. Application Data

(62) Division of application No. 09/613,607, filed on Jul. 11, 2000, now Pat. No. 6,560,295.

(60) Provisional application No. 60/153,936, filed on Sep. 15, 1999.

(51) Int. Cl.
*H04B 7/02* (2006.01)

(52) U.S. Cl. ...................................... 375/267

(58) Field of Classification Search .............. 375/259, 375/260, 262, 265, 267, 299, 295, 341, 347, 375/141; 370/320
See application file for complete search history.

(56) References Cited

U.S. PATENT DOCUMENTS

| | | | | |
|---|---|---|---|---|
| 6,115,427 A | * | 9/2000 | Calderbank et al. | ........ 375/267 |
| 6,314,147 B1 | * | 11/2001 | Liang et al. | ................. 375/346 |
| 6,327,310 B1 | * | 12/2001 | Hochwald et al. | .......... 375/259 |
| 6,351,499 B1 | * | 2/2002 | Paulraj et al. | ............... 375/267 |
| 6,430,231 B1 | * | 8/2002 | Calderbank et al. | ........ 375/295 |
| 6,510,173 B1 | * | 1/2003 | Garmonov et al. | ......... 375/141 |
| 6,587,515 B1 | * | 7/2003 | Jafarkhani et al. | .......... 375/299 |
| 2004/0146014 A1 | * | 7/2004 | Hammons et al. | .......... 370/320 |

OTHER PUBLICATIONS

Diggavi et al "Diversity-Embedded Space-Time Codes"; Global Telecommunications Conference, 2003. GLOBECOM '03. IEEE vol. 4, Dec. 1-5, 2003; pp.: 1909-1914.*

Seshadri et al "Space-Time Codes For Wireless Communication: Code Construction"; Vehicular Technology Conference, 1997 IEEE 47th; vol. 2, May 4-7, 1997; pp. 637-641.*

Tarokh et al "Space-Time Block Codes From Orthogonal Designs"; Information Theory, IEEE Transactions on vol. 45, Issue 5, Jul. 1999; pp. 1456-1467.*

* cited by examiner

*Primary Examiner*—Don N. Vo
(74) *Attorney, Agent, or Firm*—Georgann S. Grunebach

(57) ABSTRACT

Space-time codes for use with layered architectures with arbitrary numbers of antennas are provided such as rate k/n convolutional codes (e.g., rates higher than or equal to 1/n where n is the number of transmit antennas). Convolutional codes for layered space-time architectures are generated using matrices over the ring F[[D]] of formal power series in variable D.

22 Claims, 1 Drawing Sheet

METHOD OF GENERATING SPACE-TIME CODES FOR GENERALIZED LAYERED SPACE-TIME ARCHITECTURES

This application is a divisional application of application Ser. No. 09/613,607 filed Jul. 11, 2000 which issued on May 6, 2003 receiving U.S. Pat. No. 6,560,295 B1.

This application claims the benefit of provisional U.S. application Ser. No. 60/153,936, filed Sep. 15, 1999.

CROSS REFERENCE TO RELATED APPLICATIONS

Related subject matter is disclosed in U.S. patent application Ser. No. 09/397,896, filed Sep. 17, 1999, and U.S. patent application of Hesham El Gamal et al for "System Employing Threaded Space-Time Architecture for Transporting Symbols and Receivers for Multi-User Detection and Decoding of Symbols", filed even date herewith (U.S. Pat. No. 6,898,248), the entire contents of both said applications being expressly incorporated herein by reference.

FIELD OF THE INVENTION

The invention relates generally to generating codes for use in layered space-time architectures.

BACKGROUND OF THE INVENTION

Unlike the Gaussian channel, the wireless channel suffers from multi-path fading. In such fading environments, reliable communication is made possible only through the use of diversity techniques in which the receiver is afforded multiple replicas of the transmitted signal under varying channel conditions.

Recently, information theoretic studies have shown that spatial diversity provided by multiple transmit and/or receive antennas allows for a significant increase in the capacity of wireless communication systems operated in Rayleigh fading environment. Two approaches for exploiting this spatial diversity have been proposed. In the first approach, channel coding is performed across the spatial dimension, as well as the time, to benefit from the spatial diversity provided by using multiple transmit antennas. The term "space-time codes" is used to refer to this coding scheme. One potential drawback of this schemes is that the complexity of the maximum likelihood (ML) decoder is exponential in the number of transmit antennas. A second approach relies upon a layering architecture at the transmitter and signal processing at the receiver to achieve performance asymptotically close to the outage capacity. In this "layered" space-time architecture, no attempt is made to optimize the channel coding scheme. Further, conventional channel codes are used to minimize complexity. Accordingly, a need exists for a layering architecture, signal processing, and channel coding that are designed and optimized jointly.

SUMMARY OF THE INVENTION

The disadvantages of existing channel coding methods and receivers for multiple antenna communication systems are overcome and a number of advantages are realized by the present invention which provides space-time codes for use in layered architectures having arbitrary numbers of antennas and arbitrary constellations. Algebraic designs of space-time codes for layered architectures are provided in accordance with the present invention.

In accordance with an aspect of the present invention, rate k/n convolutional codes are provided for layered space-time architectures (e.g., rates higher than or equal to 1/n where n is the number of transmit antennas).

In accordance with another aspect of the present invention, convolutional codes for layered space-time architectures are generated using matrices over the ring F[[D]] of formal power series in variable D.

BRIEF DESCRIPTION OF THE DRAWINGS

The various aspects, advantages and novel features of the present invention will be more readily comprehended from the following detailed description when read in conjunction with the appended drawing, in which.

Throughout the drawing figures, like reference numerals will be understood to refer to like parts and components.

DETAILED DESCRIPTION OF THE PREFERRED EMBODIMENTS

1. Space-Time Signaling

Figure 1:
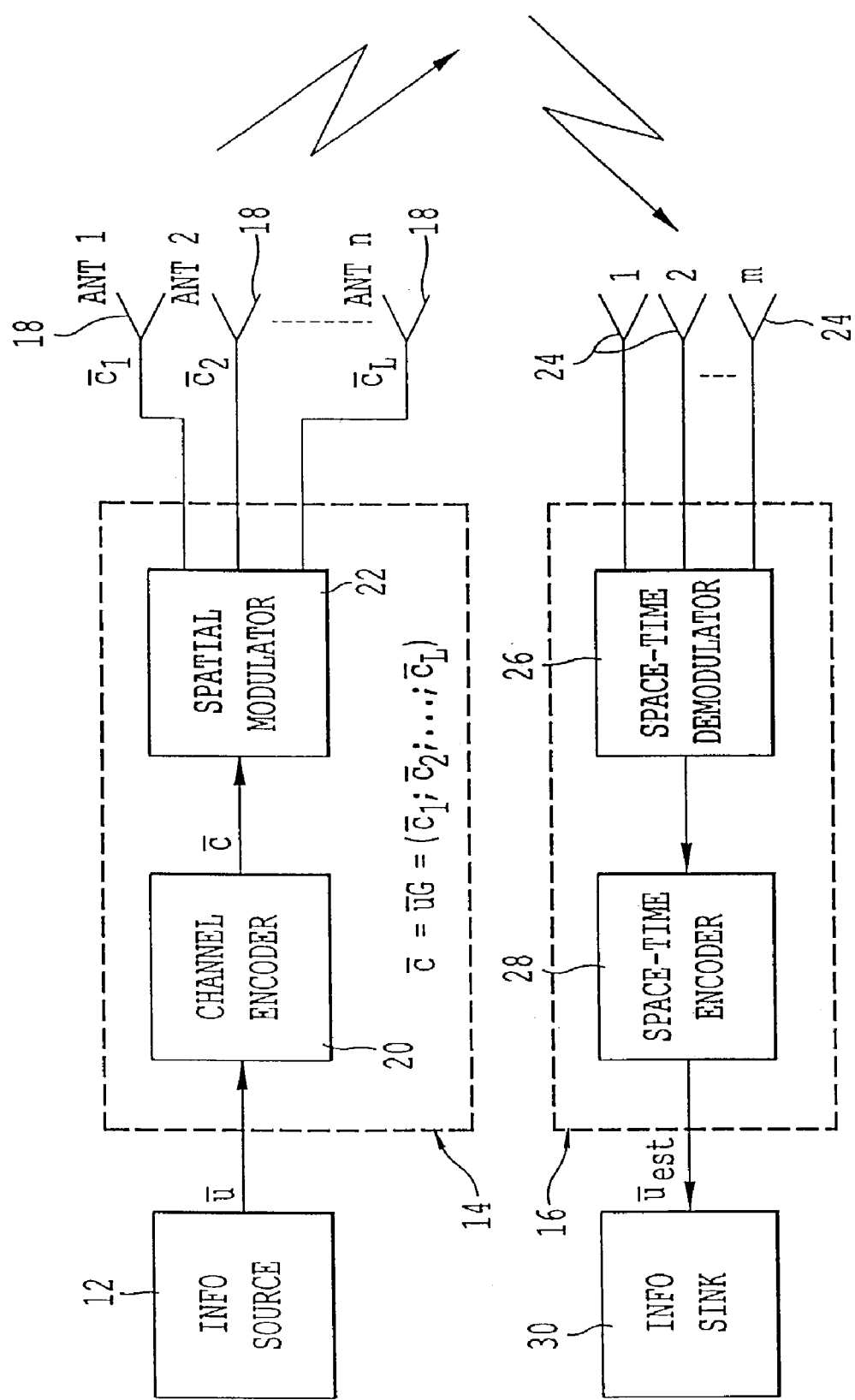
FIG. 1 is a block diagram of a multiple antenna wireless communication system constructed in accordance with an embodiment of the present invention.

FIG. 1 depicts a multiple antenna communication system 10 with n transmit antennas 18 and m receive antennas 24. In this system 10, the channel encoder 20 accepts input from the information source 12 and outputs a coded stream of higher redundancy suitable for error correction processing at the receiver 16. The encoded output stream is modulated and distributed among the n antennas via a spatial modulator 22. The signal received at each antenna 24 is a superposition of the n transmitted signals corrupted by additive white Gaussian noise and multiplicative fading. At the receiver 16, the signal $r_t^j$ received by antenna j at time t is given by $$r_t^j = \sqrt{E_s} \sum_{i=1}^{n} a_t^{(ij)} c_t^i + n_t^j \qquad (1)$$

where $\sqrt{E_s}$ is the energy per transmitted symbol;

$$a_t^{(ij)}$$

is the complex path gain from transmit antenna i to receive antenna j at time t; $c_t^i$ is the symbol transmitted from antenna i at time t; $n_t^j$; is the additive white Gaussian noise sample for receive antenna j at time t. The symbols are selected from a discrete constellation $\Omega$ containing $2^b$ points. The noise samples are independent samples of zero-mean complex Gaussian random variable with variance $N_0/2$ per dimension. The different path gains $$a_t^{(ij)}$$

are assumed to be statistically independent.

The fading model of primary interest is that of a block flat Rayleigh fading process in which the code word encompasses B fading blocks. The complex fading gains are constant over one fading block but are independent from block to block. The quasi-static fading model is a special case of the block fading model in which B=1.

The system 10 provides not one, but nm, potential communication links between a transmitter 14 and a receiver 16, corresponding to each distinct transmit antenna 18/receive antenna 24 pairing. The space-time system 10 of the present invention is advantageous because it exploits these statistically independent, but mutually interfering, communication links to improve communication performance.

2. Generalized Layering

In a layered space-time approach, the channel encoder 20 is composite, and the multiple, independent coded streams are distributed in space-time in layers. The system 10 is advantageous because the layering architecture and associated signal processing associated therewith allows the receiver 16 to efficiently separate the individual layers from one another and can decode each of the layers effectively. In such schemes, there is no spatial interference among symbols transmitted within a layer (unlike the conventional space-time code design approach). Conventional channel codes can be used while the effects of spatial interference are addressed in the signal processor design. While this strategy reduces receiver complexity compared to the non-layered space-time approach, significant gains are possible without undue complexity when the encoding, interleaving, and distribution of transmitted symbols among different antennas are optimized to maximize spatial diversity, temporal diversity, and coding gain.

A layer is defined herein as a section of the transmission resources array (i.e., a two-dimensional representation of all available transmission intervals on all antennas) having the property that each symbol interval within the section is allocated to at most one antenna. This property ensures that all spatial interference experienced by the layer comes from outside the layer. A layer has the further structural property that a set of spatial and/or temporal cyclic shifts of the layer within the transmission resource array provides a partitioning of the transmission resource array. This allows for a simple repeated use of the layer pattern for transmission of multiple, independent coded streams.

Formally, a layer in an n×l transmission resource array can be identified by an indexing set $L \subset I_n \times I_l$ having the property that the t-th symbol interval on antenna a belongs to the layer if and only if $(a, t) \in L$. Then, the formal notion of a layer requires that, if $(a, t) \in L$ and $(a', t') \in L$, then either $t \neq t'$ or $a \neq a'$—i.e., that a is a function of t.

Now, consider a composite channel encoder γ consisting of n constituent encoders $\gamma_1, \gamma_2, \ldots, \gamma_n$ operating on independent information streams. Let $\gamma_i: y^{k_i} \to y^{N_i}$, so that $k=k_1+k_2+\ldots+k_n$, and $N=N_1+N_2+\ldots+N_n$. Then, there is a partitioning $u=u_1|u_2|\ldots|u_n$ of the composite information vector $u \in y^k$ into a set of disjoint component vectors $u_i$, of length $k_i$, and a corresponding partitioning $\gamma(u)=\gamma_1(u_1)|\gamma_2(u_2)|\ldots|\gamma_n(u_n)$ of the composite code word γ(u) into a set of constituent code words $\gamma_i(u_i)$, of length $N_i$. In the layered architecture approach, the space-time transmitter assigns each of the constituent code words $\gamma_i(u_i)$ to one of a set of n disjoint layers.

There is a corresponding decomposition of the spatial formatting function that is induced by the layering. Let $f_i$ denote the component spatial formatting function, associated with layer $L_i$, which agrees with the composite spatial formatter f regarding the modulation and formatting of the layer elements but which sets all off-layer elements to complex zero. Then $$f(\gamma(u))=f_1(\gamma_1(u_1))+f_2(\gamma_2(u_2))+\ldots+f_n(\gamma_n(u_n)).$$

3. Algebraic Space-Time Code Design

A space-time code C may be defined as an underlying channel code C together with a spatial modulator function f that parses the modulated symbols among the transmit antennas. It is well known that the fundamental performance parameters for space-time codes are (1) diversity advantage, which describes the exponential decrease of decoded error rate versus signal-to-noise ratio (asymptotic slope of the performance curve in a log-log scale); and (2) coding advantage which does not affect the asymptotic slope but results in a shift in the performance curve. These parameters are related to the rank and eigenvalues of certain complex matrices associated with the baseband differences between two modulated code words.

Algebraic space-time code designs achieving full spatial diversity are made possible by the following binary rank criterion for binary, BPSK-modulated space-time codes:

Theorem 1 (Binary Rank Criterion) Let C be a linear n×l space-time code with underlying binary code C of length N=nl where $1 \geq n$. Suppose that every non-zero code word ĉ is a matrix of full rank over the binary field $\mathbb{F}$. Then, for BPSK transmission over the quasi-static fading channel, the space-time code C achieves full spatial diversity nm.

Proof: The proof is discussed in the above-referenced application Ser. No. 09/397,896.

Using the binary rank criterion, algebraic construction for space-time codes is as follows.

Theorem 2 (Stacking Construction) Let $M_1, M_2, \ldots M_n$ be binary matrices of dimension k×l, $1 \geq k$, and let C be the n×l space-time code of dimension k consisting of the code word matrices $$\hat{c} = \begin{bmatrix} xM_1 \\ xM_2 \\ \vdots \\ xM_n \end{bmatrix},$$

where x denotes an arbitrary k-tuple of information bits and $n \leq l$. Then C satisfies the binary rank criterion, and thus, for BPSK transmission over the quasi-static fading channel, achieves full spatial diversity nm, if and only if $M_1, M_2, \ldots, M_n$ have the property that $$\forall a_1, a_2, \ldots, a_n \in \mathbb{F}:$$

$M=a_1 M_1 \oplus a_2 M_2 \oplus \ldots \oplus a_n M_n$ is of full rank k unless $a_1=a_2=\ldots=a_n=0$.

Proof: The proof is discussed in the above-referenced application Ser. No. 09/397,896.

This construction is general for any number of antennas and, when generalized, applies to trellis as well as block codes. The BPSK stacking construction and its variations, including a similar version for QPSK transmission (in which case the symbol alphabet is $\mathbb{Z}_4$, the integers modulo 4), encompass as special cases transmit delay diversity, hand-crafted trellis codes, rate 1/n convolutional codes, and certain block and concatenated coding schemes. Especially interesting is the class of rate 1/n convolutional codes with the optimal $d_{free}$, most of which can be formatted to achieve full spatial diversity.

In a layered architecture, an even simpler algebraic construction is applicable to arbitrary signaling constellations. In particular, for the design of the component space-time code C associated with layer L, we have the following stacking construction using binary matrices for the quasi-static fading channel.

Theorem 3 (Generalized Layered Stacking Construction) Let L be a layer of spatial span n. Given binary matrices $M_1, M_2, \ldots, M_n$ of dimension k×l, let C be the binary code of dimension k consisting of all code words of the form $g(\underline{x})=\underline{x}M_1|M_2|\ldots\underline{x}M_n$, where $\underline{x}$ denotes an arbitrary k-tuple of information bits. Let $f_L$ denote the spatial modulator having the property that the modulated symbols $\mu(\underline{x}M_j)$ associated with $\underline{x}M_j$ are transmitted in the l/b symbol intervals of L that are assigned to antenna j. Then, as the space-time code in a communication system with n transmit antennas and m receive antennas, the space-time code C consisting of C and $f_L$ achieves spatial diversity dm in a quasi-static fading channel if and only if d is the largest integer such that $M_1, M_2, \ldots, M_n$ have the property that $\forall a_1, a_2, \ldots, a_n \in \mathbb{F}, a_1+a_2+\ldots+a_n=n-d+1$:

$M=[a_1M_1 a_2M_2 \ldots a_nM_n]$ is of rank k over the binary field.
Proof: The proof is discussed in the above-referenced application filed concurrently herewith.

Corollary 4 Full spatial diversity nm is achieved if and only if $M_1, M_2, \ldots, M_n$ are of rank k over the binary field.

The natural space-time codes associated with binary, rate 1/n, convolutional codes with periodic bit interleaving are advantageous for the layered space-time architecture as they can be easily formatted to satisfy the generalized layered stacking construction. These convolutional codes have been used for a similar application, that is, the block erasure channel. The main advantage of such codes is the availability of computationally efficient, soft-input/soft-output decoding algorithms.

The prior literature on space-time trellis codes treats only the case in which the underlying code has rate 1/n matched to the number of transmit antennas. In the development of generalized layered space-time code design of the present invention, consider the more general case in which the convolutional code has rate greater than 1/n is considered. The treatment includes the case of rate k/n convolutional codes constructed by puncturing an underlying rate 1/n convolutional code.

Let C be a binary convolutional code of rate k/n with the usual transfer function encoder Y(D)=X(D)G(D). In the natural space-time formatting of C, the output sequence corresponding to $Y_j(D)$ is assigned to the j-th transmit antenna. Let $F_j(D)=[G_{1,j}(D)\ G_{2,j}(D) \ldots G_{n,j}(D)]^T$. Then, the following theorem relates the spatial diversity of the natural space-time code associated with C to the rank of certain matrices over the ring $\mathbb{F}[[D]]$ of formal power series in D.

Theorem 5 Let C denote the generalized layered space-time code consisting of the binary convolutional code C, whose k×n transfer function matrix is $G(D)=[F_1(D)\ F_2(D)\ldots F_n(D)]$, and the spatial modulator $f_L$ in which the output $Y_j(D)=X(D)\cdot F_j(D)$ is assigned to antenna j along layer L. Let v be the smallest integer having the property that, whenever $a_1+a_2+\ldots+a_n=v$, the k×n matrix $[a_1F_1\ a_2F_2\ \ldots\ a_nF_n]$ has full rank k over $\mathbb{F}[[x]]$. Then the space-time code C achieves d-level spatial transmit diversity over the quasi-static fading channel where d=n−v+1 and v≥k.

Proof: The proof is discussed in the above-referenced application filed concurrently herewith.

Rate 1/n' convolutional codes with n'<n can also be put into this framework. This is shown by the following example. Consider the optimal $d_{free}=5$ convolutional code with generators $G_0(D)=1+D^2$ and $G_1(D)=1+D+D^2$. In the case of two transmit antennas, it is clear that the natural layered space-time code achieves d=2 level transmit diversity.

In the case of four transmit antennas, note that the rate 1/2 code can be written as a rate 2/4 convolutional code with generator matrix:

$$G(D) = \begin{bmatrix} 1+D & 0 & 1+D & 1 \\ 0 & 1+D & D & 1+D \end{bmatrix}.$$

By inspection, every pair of columns is linearly independent over $\mathbb{F}[[D]]$. Hence, the natural periodic distribution of the code across four transmit antennas produces a generalized layered space-time code achieving the maximum d=3 transmit spatial diversity.

For six transmit antennas, the code is expressed as a rate 3/6 code with generator matrix:

$$G(D) = \begin{bmatrix} 1 & 0 & 1 & 1 & 1 & 1 \\ D & 1 & 0 & D & 1 & 1 \\ 0 & D & 1 & D & D & 1 \end{bmatrix}.$$

Every set of three columns in the generator matrix has full rank over $\mathbb{F}[[D]]$, so the natural space-time code achieves maximum d=4 transmit diversity.

Thus far, the design of generalized layered space-time codes that exploit the spatial diversity over quasi-static fading channels has been discussed. The results obtained for generalized layered space-time code design, however, are easily extended to the more general block fading channel. In fact, in the absence of interference from other layers, the quasi-static fading channel under consideration can be viewed as a block fading channel with receive diversity, where each fading block is represented by a different antenna. For the layered architecture with n transmit antennas and a quasi-static fading channel, there are n independent and non-interfering fading links per code word that can be exploited for transmit diversity by proper code design. In the case of the block fading channel, there is a total of nB such links, where B is the number of independent fading blocks per code word per antenna. Thus, the problem of block fading code design for the layered architecture is addressed by simply replacing parameter n by nB.

For example, the following "multi-stacking construction" is a direct generalization of Theorem 3 to the case of a block fading channel. In particular, special cases of the multi-stacking construction are given by the natural space-time codes associated with rate k/n convolutional codes in which various arms from the convolutional encoder are assigned to different antennas and fading blocks (in the same way that Theorem 5 is a specialization of Theorem 3).

Theorem 6 (Generalized Layered Multi-Stacking Construction) Let L be a layer of spatial span n. Given binary matrices $M_{1,1}, M_{2,1}, \ldots, M_{n,1}, \ldots, M_{1,B}, M_{2,B}, \ldots, M_{n,B}$ of dimension k×l, let C be the binary code of dimension k consisting of all code words of the form $g(\underline{x})=\underline{x}M_{1,1}|\underline{x}M_{2,1}|\ldots|\underline{x}M_{n,1}|\ldots|\underline{x}M_{1,B}|\underline{x}M_{2,B}|\ldots|\underline{x}M_{n,B}$, where $\underline{x}$ denotes an arbitrary k-tuple of information bits, and B is the number of independent fading blocks spanning one code word. Let $f_L$ denote the spatial modulator having the property that $\mu(\underline{x}M_{j,v})$ is transmitted in the symbol intervals of L that are assigned to antenna j in the fading block v.

Then, as the space-time code in a communication system with n transmit antennas and m receive antennas, the space-time code C consisting of C and $f_L$ achieves spatial diversity dm in a B-block fading channel if and only if d is the largest integer such that $M_{1,1}, M_{2,1}, \ldots, M_{n,B}$ have the property that $\forall a_{1,1}, a_{2,1}, \ldots, a_{n,B} \in \mathbb{F}, a_{1,1}+a_{2,1}+ \ldots +a_{n,B}=nB-d+1$:

$M=[a_{1,1}M_{1,1}a_{2,1}M_{2,1} \ldots, a_{n,B}M_{n,B}]$ is of rank k over the binary field.

4. Conclusions

An algebraic approach to the design of space-time codes for layered space-time architectures has been formulated; and new code constructions have been presented for the quasi-static fading channel as well as the more general block fading channel. It is worth noting that, in the absence of interference from other layers, the fading channel experienced by a given coded layer is equivalent to a block fading channel with receive diversity. Thus, the algebraic framework provided by the present invention is also useful for block fading channels without transmit diversity.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A method of encoding in a multiple antenna system, the method comprising the steps of:
    receiving an information stream; and
    generating a space-time code in response to the information stream, wherein the space-time code has a layered architecture that permits full spatial diversity with arbitrary numbers of antennas and signal constellations, each layer having a symbol interval allocated to a single antenna.

2. A method according to claim 1, further comprising the step of:
    modulating the space-time code according to one of binary phase shift keying (BPSK) or quadrature phase shift keying (QPSK).

3. A method according to claim 1, wherein the space-time code is generated based on a plurality of binary matrices $M_1, M_2, \ldots, M_n$ of dimension k×l, 1≧k as characterized by $\forall a_1, a_2, \ldots, a_n \in F$:

$M=a_1M_1 \oplus a_2M_2 \oplus \ldots \oplus a_nM_n$ is of full rank k, where F is a binary field.

4. A method according to claim 1, wherein the space-time code is associated with a binary convolutional code with periodic bit interleaving, a trellis code, a block code, or a concatenated code.

5. A method according to claim 1, wherein the layered architecture is based on an optimized channel coding scheme.

6. A computer-readable medium bearing instructions for encoding in a multiple antenna system, said instruction, being arranged, upon execution, to cause one or more processors to perform the method of claim 1.

7. An apparatus for communicating in a multiple antenna system, the apparatus comprising:
    an encoder configured to generate a space-time code in response to receiving an information stream,
    wherein the space-time code has a layered architecture that permits full spatial diversity with arbitrary numbers of antennas and signal constellations, each layer having a symbol interval allocated to a single antenna.

8. An apparatus according to claim 7, further comprising:
    a modulator configured to modulate the space-time code according to one of binary phase shift keying (BPSK) or quadrature phase shift keying (QPSK).

9. An apparatus according to claim 7, wherein the space-time code is generated based on a plurality of binary matrices $M_1, M_2, \ldots, M_n$ of dimension k×l, 1≧k as characterized by $\forall a_1, a_2, \ldots, a_n \in F$:

$M=a_1M_1 \oplus a_2M_2 \oplus \ldots \oplus a_nM_n$ is of full rank k, where F is a binary field.

10. An apparatus according to claim 7, wherein the space-time code is associated with a binary convolutional code with periodic bit interleaving, a trellis code, a block code, or a concatenated code.

11. An apparatus according to claim 7, wherein the layered architecture is based on an optimized channel coding scheme.

12. A method of conmmnicating in a radio communication system, the method comprising the steps of:
    receiving a plurality of coded streams representing space-time codes having a layered architecture that permits full spatial diversity with arbitrary numbers of antennas and signal constellations, each layer having a symbol interval allocated to a single antenna; and
    decoding the received coded streams.

13. A method according to claim 12, further comprising the step of:
    demodulating the space-time code according to one of binary phase shift keying (BPSK) or quadrature phase shift keying (QPSK).

14. A method according to claim 12, wherein the space-time code is generated based on a plurality of binary matrices $M_1, M_2, \ldots, M_n$ of dimension k×l, 1≧k as characterized by $\forall a_1, a_2, \ldots, a_n \in F$:

$M=a_1M_1 \oplus a_2M_2 \oplus \ldots \oplus a_nM_n$ is of full rank k, where F is a binary field.

15. A method according to claim 12, wherein the space-time code is associated with a binary convolutional code with periodic bit interleaving, a trellis code, a block code, or a concatenated code.

16. A method according to claim 12, wherein the layered architecture is based on an optimized channel coding scheme.

17. A computer-readable medium bearing instructions for communicating in a radio communication system, said instruction, being arranged, upon execution, to cause one or more processors to perform the method of claim 12.

18. A method for generating space-time codes, the method comprising the step of: outputting a codeword having an algebraic construction for a layered space-time architecture,
    wherein the algebraic construction is based on an optimized channel coding scheme and achieves full spatial diversity with variable numbers of antennas and signal constellations.

19. A method according to claim 18, wherein the codeword is modulated according to one of binary phase shift keying (BPSK) or quadrature phase shift keying (QPSK).

20. A method according to claim 18, wherein the algebraic construction specifies a plurality of binary matrices $M_1, M_2, \ldots, M_n$ of dimension k×l, 1≧k as characterized by $\forall a_1, a_2, \ldots a_n \in F$:

$M = a_1 M_1 \oplus a_2 M_2 \oplus \ldots \oplus a_n M_n$ is of full rank k, where F is a binary field.

21. A method according to claim 18, wherein the space-time code is associated with a binary convolutional code with periodic bit interleaving, a trellis code, a block code, or a concatenated code.

22. A computer-readable medium bearing instructions for generating space-time codes, said instruction, being arranged, upon execution, to cause one or more processors to perform the method of claim 18.

\* \* \* \* \*